(12) United States Patent
Almgren et al.

(10) Patent No.: US 6,212,384 B1
(45) Date of Patent: *Apr. 3, 2001

(54) RADIO SIGNAL SOURCE IDENTIFICATION SYSTEM

(75) Inventors: Knut Magnus Almgren, Sollentuna; Håkan Gunnar Olofsson; Sverker Magnusson, both of Stockholm, all of (SE)

(73) Assignee: Telefonaktiebolaget L M Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/940,263

(22) Filed: Sep. 29, 1997

(51) Int. Cl.[7] .................................................. H04Q 7/20
(52) U.S. Cl. ......................... 455/446; 455/456; 455/422
(58) Field of Search ................................. 455/456, 450, 455/446, 524, 437, 436, 423, 424, 425, 422

(56) References Cited

U.S. PATENT DOCUMENTS

| | | |
|---|---|---|
| 4,918,690 | 4/1990 | Markkula, Jr. et al. . |
| 5,095,500 * | 3/1992 | Tayloe et al. ........................... 379/32 |
| 5,212,831 * | 5/1993 | Chuang et al. ...................... 455/54.1 |
| 5,218,716 | 6/1993 | Comroe et al. . |
| 5,293,642 | 3/1994 | Lo . |
| 5,379,447 * | 1/1995 | Bonta et al. .......................... 455/437 |
| 5,408,683 | 4/1995 | Ablay et al. . |
| 5,418,838 * | 5/1995 | Havermans et al. .................. 455/465 |
| 5,465,390 * | 11/1995 | Cohen ................................... 455/446 |
| 5,509,053 * | 4/1996 | Gowda et al. ........................ 455/465 |
| 5,519,760 | 5/1996 | Borkowski et al. . |
| 5,526,400 * | 6/1996 | Nguyen ................................. 455/432 |
| 5,537,460 | 7/1996 | Holliday, Jr. et al. . |
| 5,542,120 | 7/1996 | Smith et al. .......................... 455/54.1 |
| 5,548,801 | 8/1996 | Araki et al. . |
| 5,548,816 * | 8/1996 | DeVaney ............................... 455/456 |
| 5,564,079 | 10/1996 | Olsson . |
| 5,590,398 | 12/1996 | Matthews . |
| 5,642,398 * | 6/1997 | Tiedemann, Jr. et al. ........... 455/426 |
| 5,682,416 * | 10/1997 | Schmidt et al. ...................... 455/436 |
| 5,706,333 * | 1/1998 | Grenning et al. .................... 455/423 |
| 5,724,665 * | 3/1998 | Abbasi et al. ........................ 455/561 |
| 5,768,267 * | 6/1998 | Raith et al. ........................... 370/329 |
| 5,802,477 * | 9/1998 | Mozokami et al. .................. 455/525 |
| 5,805,633 * | 9/1998 | Uddenfeldt ........................... 375/133 |
| 5,848,358 * | 12/1998 | Forssen et al. ....................... 455/437 |
| 5,903,840 * | 5/1999 | Bertacchi ............................. 455/436 |
| 5,943,332 * | 8/1999 | Liu et al. .............................. 370/342 |
| 6,078,815 * | 6/2000 | Edwards ............................... 455/450 |

FOREIGN PATENT DOCUMENTS

| | | |
|---|---|---|
| 0 431 956 A2 | 6/1991 | (EP) . |
| 0 752 766 A1 | 1/1997 | (EP) . |
| WO 97 32445 | 9/1997 | (WO) . |
| PCT/SE98/ 01643 | 12/1998 | (WO) . |

* cited by examiner

Primary Examiner—Nay Maung
Assistant Examiner—Sonny Trinh
(74) Attorney, Agent, or Firm—Jenkens & Gilchrist, P.C.

(57) ABSTRACT

The source cell of a radio signal broadcast within a cellular radio network is determined by several alternative techniques. Each involves either a mobile station or a base station broadcasting a system-unique identity signal from which the network can determine the source of the signal. From the unique source of the signal the network can determine the geographic source from which the signal originated and use that information to perform automatic system administration functions, such as, prepare a best neighbor list or perform frequency planning and allocation for the network.

44 Claims, 5 Drawing Sheets

RADIO SIGNAL SOURCE IDENTIFICATION SYSTEM

BACKGROUND OF THE INVENTION

1. Field of the Invention

The present invention relates to cellular radio telecommunication systems and, more particularly, to a method and system for uniquely locating the source of a radio signal within the cells of a cellular radio system.

2. Description of the Related Art

In a cellular radio telecommunications system, the area within which a plurality of mobile stations are served by the system is divided into cells. Each idle and active mobile station within a cell remains in radio contact with the base station serving that cell. In conventional operation, when a mobile station that is engaged in active communication moves from one cell to another cell the cellular system performs a hand-off in which the moving mobile station is instructed to retune its radio to a new traffic channel which is served by the base station of the cell it is now entering.

A cellular system must know the approximate location of each of the mobile stations engaged in active communication in order to provide efficient hand-off and traffic management functionality. Location information is generally provided by the measurement of signal strength of radio signals passing between the mobile station and its serving base station as well as radio signals of neighboring base stations serving the cells in the surrounding geographic area.

Cellular radio telecommunication systems require information concerning a mobile station's location primarily for hand-off administration and other traffic management functions. As a mobile station traverses the cell boundaries of a system it is handed off from one cell to another. In North American analog cellular systems, once a mobile station's transmitted signal is perceived as being below a preselected threshold value at the base station currently serving that mobile, the serving base station sends a measurement request to neighboring cells asking for a measurement of the received signal strength indication (RSSI) of the mobile station's signal by the base stations serving these neighboring cells. If the mobile's current serving base station does not have the strongest RSSI the system will identify the cell with the strongest RSSI as the target cell for a hand-off; that is, the next cell to serve the mobile station when hand-off is executed.

In the North American dual mode digital cellular system, implemented in accordance with IS-54 and IS-136, digital mobile stations are equipped with mobile assisted hand-off (MAHO) capabilities. When MAHO is activated, a mobile station periodically measures and reports the strength of the signal transmitted from its serving base station as well as the strengths of signals from up to 12 other neighboring base stations. The network of the serving base station may use MAHO-reported signal strength in the downlink (base to mobile) direction together with the signal strength in the uplink (mobile to base) direction, together with the decoded color code, measured by neighboring base stations to make its hand-off decisions.

The Global System for Mobile (GSM) digital cellular radio system in use in Europe, North America and other parts of the world also provides a mobile system management function which enables a mobile station to identify neighboring base stations by means of signal measurements. A mobile is intended to be able to identify the source of the signal being received from one of its neighboring base stations by decoding the base station identity code (BSIC) which is transmitted on the broadcast control channel (BCCH) frequency of each of the cells. In the North American analog system (AMPS) and dual mode system (D-AMPS) a "color code" signal is instead transmitted by each of the base stations so that a mobile station can listen to the color code signal of its base station and then rebroadcast that color code to allow identification of the base station by which it is currently being served. In certain cases, the synchronization code sent in each burst can also be used as an identification of the origin of the signal.

Since the identity information encoded into the BSIC signal and in the color codes incorporated into the AMPS and D-AMPS signals consists of only a few bits and are reused within the same system, it is likely that more than one transmitter within a single large system may transmit the same identity information on the same frequency. Thus, it is impossible with these techniques for the network control of the system to uniquely identify a signal as having its source as being from within a particular cell or from a particular mobile on a system-wide basis.

When a mobile station is engaged in the call setup process with the cellular system it periodically broadcasts an identification of its identity, for example, its international mobile subscriber identity (IMSI). However, while the mobile is actively engaged in a call, it generally does not sent out any indicia which specifically identifies it and from which the system can associate that mobile with a specific traffic channel frequency being served by a specific base station within the system. Thus, the network cannot discern from the signal broadcast by the mobile on its traffic channel the specific identity of that mobile.

As cellular systems become more complex and network control systems become more sophisticated it is desirable to automate many of the different administrative functions which are conventionally done manually or with empirically derived parameters. For example, each cellular system must have a good frequency plan specifying which frequencies are reused in different cells of the system to maximize the availability of traffic channels to its subscribers throughout the system while minimizing cochannel interference between different cells. Most frequency plans are formulated today by either predicting interference between frequencies reused in different cells with a propagation model or by systematic measurement of system performance to develop empirical data and experience. For operators whose systems are growing rapidly with the frequent addition and rearrangement of base stations, these techniques of frequency planning are both slow and costly. Moreover, the recent introduction of microcells and picocells into a system make frequency planning even more difficult. If algorithms could be developed to actually measure and collect data on cochannel interference in each of the cells throughout a cellular system it would be a great advantage. For example, such measured and collected data would be more accurate than predicted values and would eliminate the need for digital maps and sophisticated propagation models and the associated time-consuming computations used in conventional frequency planning. The actual frequency allocation might be done either manually or the system itself could reallocate frequencies from time to time and, in effect, automatically amend the frequency plan for maximum efficiency of reuse. A principal drawback to the development of such adaptive algorithms is, however, the lack of sufficiently detailed system information to uniquely determine from which base station or mobile station a particular interfering signal is originating. Without a truly unique identity code associated with each traffic signal measured by a mobile station or base station it is difficult to identify the mobile or cell from which the interference is originating and develop an algorithm for identifying and correcting the interfering condition based upon measurements within the system.

Another exemplary administrative function within a cellular system which is a possible candidate for automation is the assembly of a neighbor cell list to be sent to a mobile during a call. This list specifies which neighboring cell carrier frequencies on which the mobile is to periodically measure the signal strength and report the results to the serving base station and the network for possible handoff purposes. Today the preparation of such lists is a non-trivial exercise of examining the coverage areas of different cells and deciding which are likely to be the best possible neighboring cells in each instance. If the system could directly measure and monitor the signal strength of the frequencies in various cells, and determine, for example, which frequencies in which cells are experiencing interference and from which other cells that interference is coming, such information could be used in an algorithm to prepare a best neighbor cell list. Similarly, a measured good frequency could be identified as being associated with the unique identity of the base station of its origin and added to the neighbor cell list. However, the BSIC value transmitted as part of the BCCH carrier frequency signal associated with each base station is not "system unique", and consequently insufficient for providing the basis for such adaptive algorithms.

For purposes within a cellular radio system such as that illustrated above, it is very important to identify the unique origin of a signal in order to increase the accuracy and ease with which frequency information is collected as well as to be able to develop algorithms for use within the system. The design of a self-configuring cellular system which adapts to changes in the infrastructure, due, for example to the addition or relocation of base stations within the system, would require the use of adaptive algorithms. Similarly, adaptive neighboring cell lists are necessary in order to design a self-configuring cellular system and unique identification of the participants involved in a call in another cell is necessary in order to develop smart adaptive cell list algorithms.

BRIEF SUMMARY OF THE INVENTION

In one aspect, the present invention includes identification of a particular cell from which a measured radio signal is received from a mobile station within a cellular radio communication network. Indicia which associates each mobile station with the base station which is currently serving it are stored within the network. An identity signal which contains the unique identity of the mobile station within said network is periodically transmitted as part of the radio signal from a mobile station. The radio signal containing the identity signal is received from the mobile station at a base station which serves a cell which is not the current serving cell of the mobile station. The value of the received radio signal is measured, and a message is sent from the receiving base station to the network to determine with which base station the mobile station having the unique identity is presently associated. The cell served by the associated base station is considered as the source of the signal received from the mobile station and measured by the receiving base station.

In another aspect, the measurement information from said measurement reports is used within the network to formulate a best neighbor list for at least one mobile station. It may also be used to formulate a frequency usage plan for a group of cells within said network which include the cell serving said uniquely identified mobile station.

In a further aspect the present invention includes the identification of a particular cell from which a measured radio signal is received from a mobile station within a cellular radio communication network. An identity signal which contains the unique identity of the base station is transmitted from a base station to each mobile station it is serving. The radio signal which is to be measured is received at a mobile station. An identity signal which contains the unique identity of the base station which it is serving is periodically transmitted as part of the radio signal from the mobile station. The value of the received radio signal from the mobile station is periodically measured at a base station which is not serving the mobile station. The measurements of the received radio signal are associated with the cell served by the base station identified in the identity signal as the source of the signal received from the mobile station and measured by the receiving base station.

In still a further aspect, the present invention includes the identification of a particular cell from which a measured radio signal is received by a mobile station within a cellular radio communication network. An identity signal which contains the unique identity of said base station is periodically transmitted from a base station. A radio signal from a base station which is to be measured is received at a mobile station and contains the unique identity signal. The value of the received radio signal from said base station is periodically measured at a mobile station which is not being served by the base station. The measurements of the received radio signal is associated with the cell served by the base station identified in the identity signal as the source of the signal.

BRIEF DESCRIPTION OF THE DRAWINGS

For an understanding of the present invention and for further objects and advantages thereof, reference can now be had to the following description, taken in conjunction with the accompanying drawings in which.

DETAILED DESCRIPTION OF THE PREFERRED EMBODIMENT

To provide a context within which the details of the present invention may be set forth, the general construction and operation of a cellular mobile radio system will first described.

Figure 1:
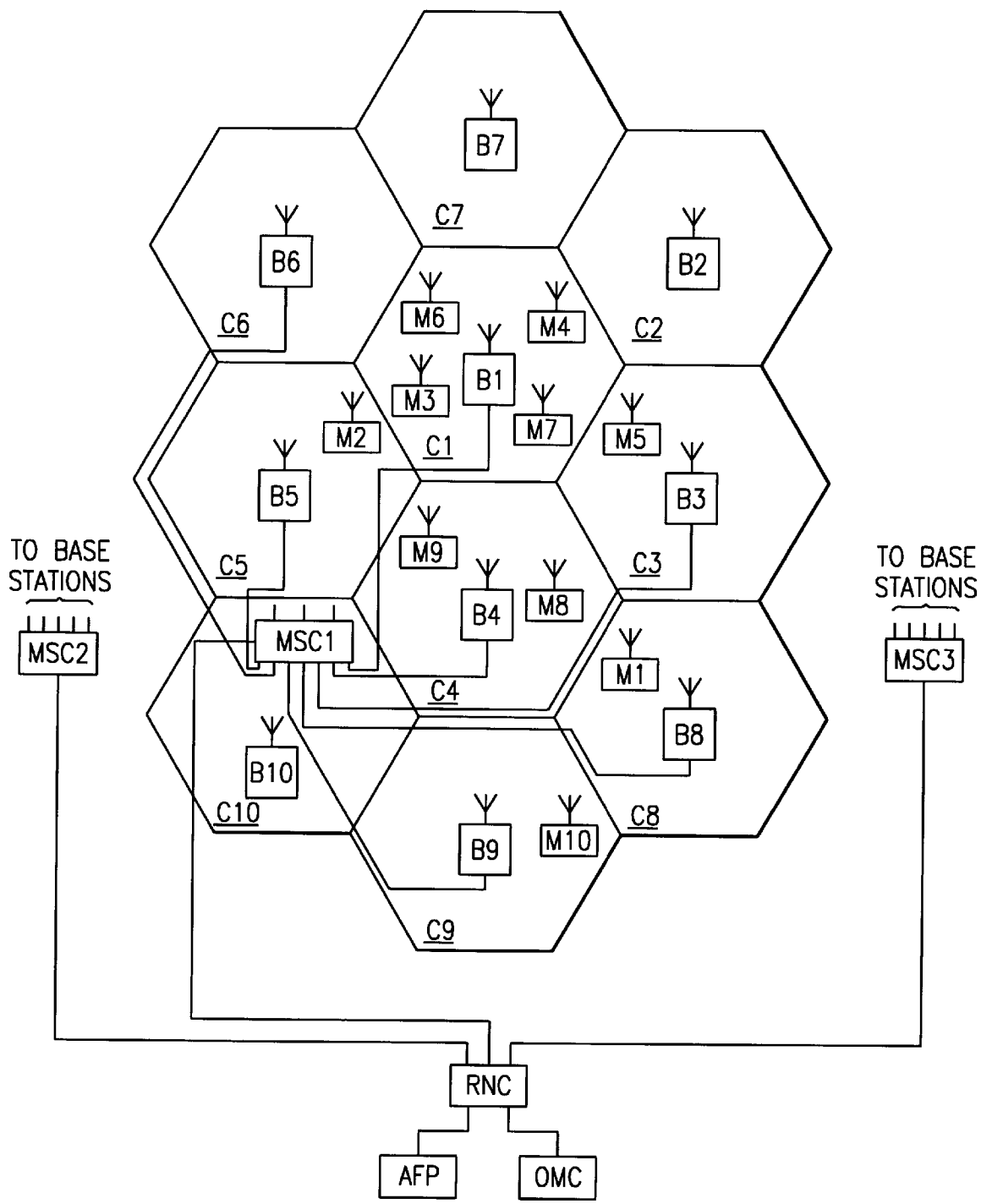
FIG. 1 is a diagrammatic depiction of a cellular radio system including a plurality of cells, base stations and mobile stations within which an embodiment of the present invention may be used.

FIG. 1 is a diagrammatic representation of such a system which contains ten cells, C1–C10. Of course, a cellular radio system would contain many more cells than ten but for purposes of this illustration the system shown in FIG. 1 may be considered to be an isolated portion of a larger system, only ten cells of which are shown.

Within each of the cells C1–10, there is a corresponding respective base station B1–B10 serving that cell. In the exemplary embodiment of FIG. 1, the base stations B1–B10 are shown as having omni-directional antennas and being located in the vicinity of the center of the cells, however, a person skilled in this art will recognize that base stations may typically be located in other areas of the cells, for example, at the intersection of three adjacent cells and have sectorized antennas so that a single base station may serve three cells. Also shown in FIG. 1 are a plurality of mobile stations, M1–M10 which are subject to movement within each cell and from one cell to another cell. Of course, a typical cellular system would have many more mobile stations operating within it than ten. A mobile switching center MSC1 is connected to each of the base stations B1–B10 by means of a cable or microwave and to a switched telecommunication network (PSTN). The mobile switching center MSC1, along with other mobile switching centers MSC2 and MSC3, are each connected to a radio network controller (RNC) which handles the overall control of the entire cellular radio telecommunication network. An operation and maintenance center (OMC) is connected to the RNC which is also connected to administrative control modules such as the exemplary automatic frequency planner (AFP) indicated.

Each cellular radio telecommunication system is assigned a particular frequency band within which is must operate. This frequency band is subdivided into units called frequencies, groupings of which are allocated to the cells located in a particular area. Because of the limited radio frequency spectrum which is available to each operator, it is important to efficiently use these frequencies in order to maximize the traffic capacity and economic return of the cellular system. Many different frequency reuse plans have been implemented in order to try and more efficiently allocate radio channels within the available spectrum to different cells. Certain of the these channel allocation methodologies assign fixed sets of channels to each cell, while others allocate channels dynamically based upon traffic densities and/or interference situations. The present invention relates to uniquely identifying the source of signals within a cellular network to enhance the accuracy and ease with which frequency planning may be performed. Such identification also allows automated administration algorithms, such as an automatic frequency planning module for example, to perform regular and systematic dynamic channel allocation within cells in order to automatically realign the frequency allocation plan of the system to maximize channel utilization while minimizing co-channel interference within the system.

Figure 2:
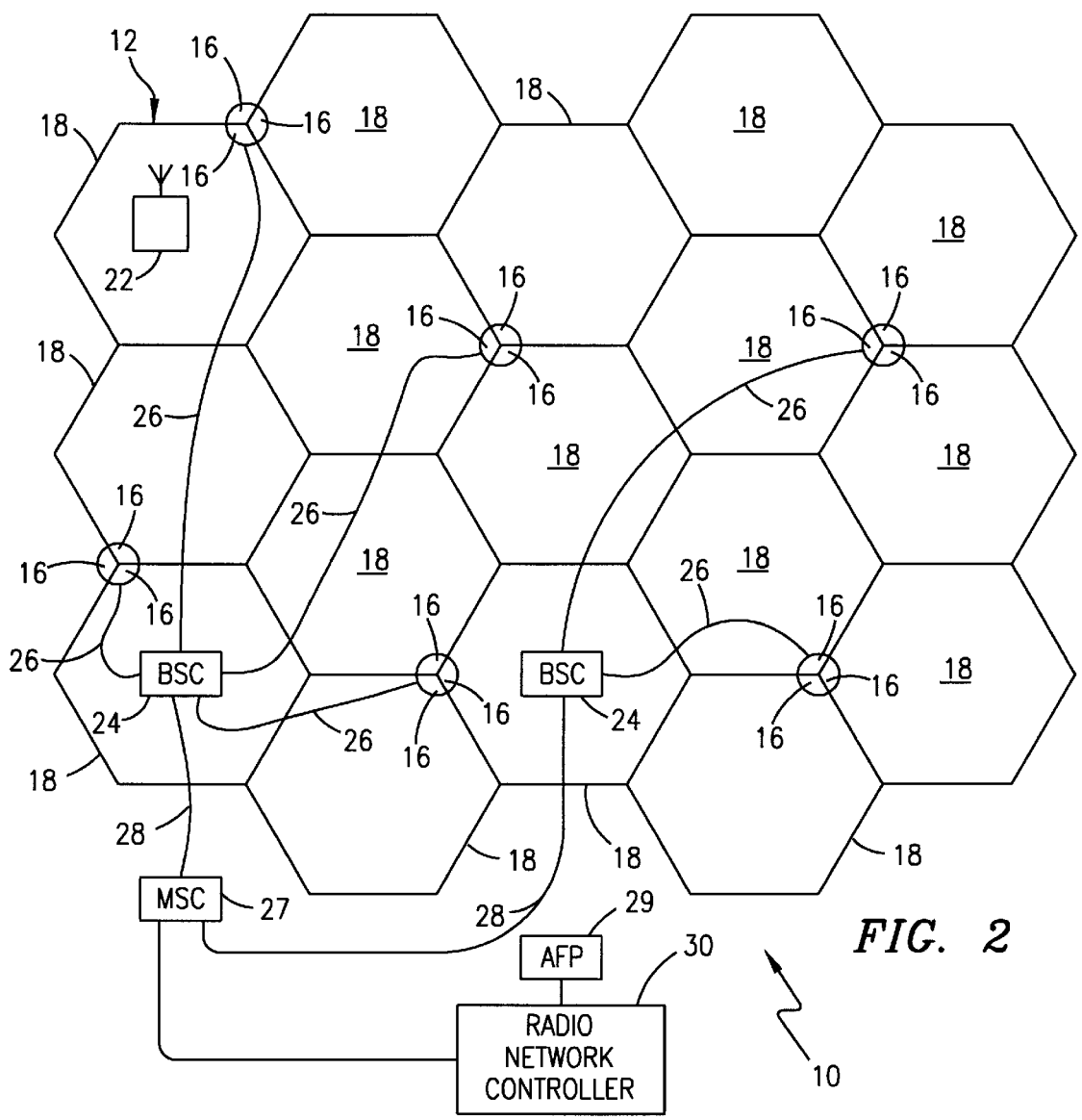
FIG. 2 is a functional block diagram representative of a cellular radio telecommunication system employing sectorized antennas within which an embodiment of the present invention may be incorporated.

FIG. 2 illustrates another exemplary cellular radio telecommunication system which employs base stations each having three sectorized antennas. The system, shown generally at 10, comprises a cellular network 12 which includes a plurality of fixed site base stations 16 positioned at spaced-apart locations throughout a geographical area. In the illustration of FIG. 2, each of the base stations 16 defines a cell 18 and groups of three base stations 16 are located together and each of the co-located base stations serves a coverage area which defines three adjacent but separate cells 18—18. Each base station 16 typically includes a fixed site transceiver which utilizes a sectorized antenna covering approximately 120° and is located on the periphery of the cell which it is serving. Each of the base stations 16 permit wireless radio communication to be effectuated with remotely positioned mobile subscriber terminals, such as the subscriber terminal 22, when the mobile is positioned within communication range of the respective one of the base stations.

The cells 18—18 defined by the coverage areas of the base stations are shown to be hexagonal in shape purely for purposes of illustration. In an actual system, the communication range, i.e., the coverage area, of a base station would differ from that shown in the figure. That is to say, cells 18—18 may well be non-symmetrical with respect to the base station and the cells defined by different ones of the base stations 16—16 would likely differ in shape from one another. Also, in an actual cellular radio communication system, the coverage areas of different (such as adjacent) base stations would overlap with one another to a certain degree.

Groups of the base stations 16 are coupled to a base station controller (BSC) 24. Communication lines 26 couple the base stations 16—16 to the BSCs 24 which are in turn coupled to mobile switching centers (MSCs), such as MSC 27 by way of communication lines 28. The MSCs, of which one MSC 27 is illustrated in FIG. 2, are coupled to a radio network controller (RNC) 30 which is responsible to coordinate the control and administrative functions of the entire network. Administration modules, such as automatic frequency planner (AFP) module 29, are connected to the RNC 30 to perform specialized tasks.

As shown in FIG. 2, when the mobile subscriber terminal 22 communicates with another communication station connected to the network, those communications are effected by way of a base station 16 within the network 12. When the mobile terminal 22 moves between cells 18—18 of the network 12, ongoing communications are handed over between successive ones of the base stations 16. If the mobile terminal is in the idle mode, cell selection, such as that which occurs during registration procedures, is performed when the mobile moves from cell to cell.

In one embodiment of the system of FIG. 2, when the mobile terminal is in the active mode hand-overs are made responsive, in part, to mobile assisted hand-off MAHO measurements made by the mobile terminal 22. When positioned in a cell and a call is being setup, the mobile terminal 22 tunes to the broadcast control channel (BCCH) of the base station serving the cell in which is it located. The mobile is sent on the BCCH a list of the BCCH carrier frequencies associated with base stations defining cells which are neighbors to the cell in which the mobile terminal is located the so-called BA-list. Once the mobile becomes active the BA-list may be periodically updated on the slow associated control channel (SACCH). The mobile terminal is provided with the BA-list of radio frequencies of the BCCHs of the base stations associated with the "neighbor cells" to the mobile's currently serving cell in order to permit the mobile terminal to sequentially tune its radio to each of these channels for signal quality measurements.

Signal strength measurements are made by the mobile terminal of the BCCHs broadcast by each of the base stations of the neighboring cells and also of the BCCH of the base station through which the mobile station is currently communicating, i.e. the mobile's "serving" base station. In the GSM system the mobile also seeks to decode the base station identity code (BSIC) of each of the BCCH signals it measures. Indications of the results of signal quality measurements by the mobile, e.g., the six largest value signals on BCCH's for which it could decode BSIC, are reported back to its serving base station in the form of a measurement report and from there to the BSC 24 and the RNC 30. When the signal quality of a BCCH broadcast by a base station of a neighboring cell becomes better than that of the BCCH of the serving base station, the BSC 24 or MSC 27 permits a new cell selection, such as a hand-over, to be effectuated.

Another signal quality measurement commonly performed in cellular systems is that of various frequencies, both BCCH and TCH channels, on the uplink; that is, the signal strength as received at the base station. However, as pointed out above, it is difficult for the network to be sure of the unique origin, either mobile or base station, of these signals. This is because of the absence of a unique identifier within each.

Figure 3:
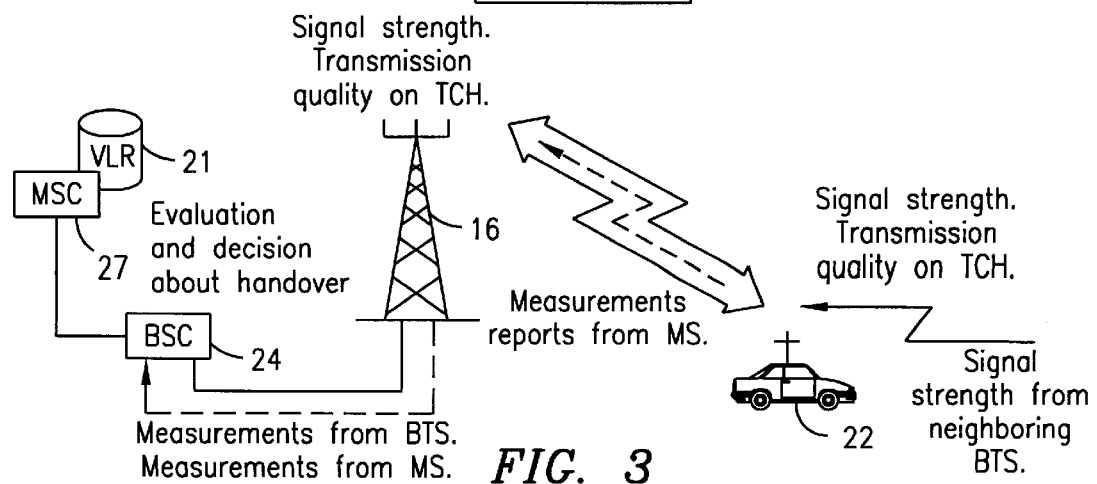
FIG. 3 is an illustrative diagram of the manner in which signal strength measurements are performed in anticipation of hand-off in a cellular radio system.

Referring next to FIG. 3, as discussed briefly above, in order to choose the best target cell for possible hand-over, signal quality measurements are performed by both the mobile station and the base station. The fact that the mobile station contributes to the decision to perform the hand-off is referred to as mobile assisted hand-off (MAHO). In FIG. 3, conventional MAHO measurements in anticipation of hand-off are illustrated. A base station 16 is connected to a base site controller 24 which is, in turn, connected to an MSC 27. The MSC 27 is shown in FIG. 3 as being associated with a visiting location register (VLR) 21. The base station 16, also referred to as a base transceiver station (BTS) is in communication with the mobile station 22 over a traffic channel (TCH). The mobile station 22 continuously measures signal quality, i.e. signal strength and bit error rate (BER) on its own serving cell and signal quality on the BCCH-carriers of the neighboring cells based upon a list of carrier frequencies, the BA-list, to be used for cell selection for possible hand-off of the mobile. These measurements are made on the down-link radio connection. Measurement results obtained by the mobile station are periodically sent to the base station on the slow associated control channel (SACCH). The serving base station measures the signal quality on the uplink to the mobile station. The measurements by the base station and the measurements by the mobile station are both sent from the base station to the BSC as measurement reports. On the basis of these reports the BSC, in cooperation with the MSC 27 in some cases, decides if a hand-over is necessary and to which new cell the hand-off should be made. In general, as soon as one of the neighboring cells is considered better than the serving cell a hand-off is attempted.

While the conventional measurements of signal strength and BER with respect to the current serving cell and the neighboring cells are sufficient to allow the selection of one of a plurality of adjacent cells as being the best for communication with a given mobile at a given time, hand-over execution is a relatively simple algorithm. In the development of more complex algorithms for different purposes, for example, for the automatic generation of adaptive neighboring cell lists or frequency plans, an essential parameter is knowledge of precisely which base station is serving each mobile station at the time signal quality measurements are made.

The principal way in which base station identification has been attempted in the past is reception by the base station of color code information from the mobile station in the AMPS and D-AMPS systems and the decoding of base station identity codes (BSIC) in GSM digital systems. While the color code information does identify each base station it does not uniquely identify it within the system. Color codes may be reused for different base stations in the same system. Similarly, BSIC information allows a digital mobile station to distinguish between different neighboring base stations and is made up of a network color code (NCC) together with a base station color code (BCC), each three bits in length. The NCC identifies the particular GSM mobile network and is used primarily to distinguish between operators on each side of a geographical border. The BCC identifies a particular base station to distinguish between respective BTSs using the same BCCH frequencies. However, within a given cellular radio system, it is likely that different base stations within the same system may transmit the same BSIC on the same frequencies. Thus, for system wide algorithm development, neither of these techniques for identifying a base station are sufficiently reliable to ensure unique identification of the source of a signal which has been measured. Such unique identification is essential for purposes of automated algorithm based administrative functions.

Figure 4:
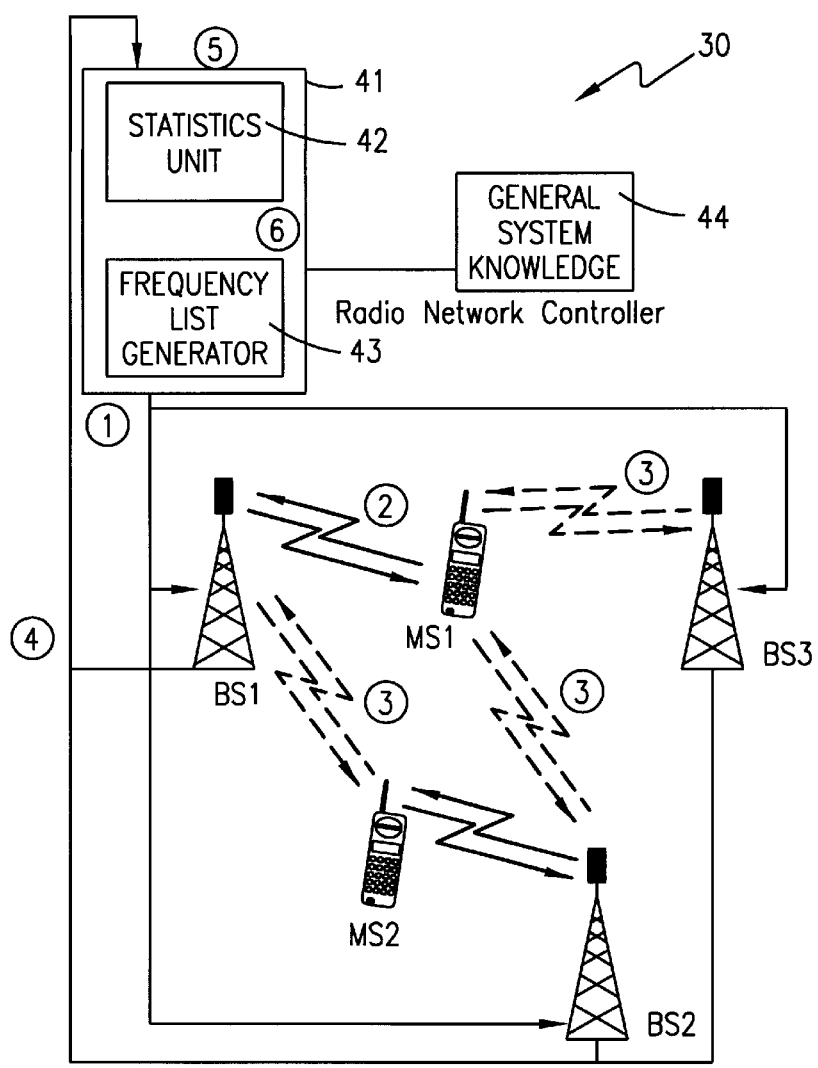
FIG. 4 is a block diagram illustrating the generation of neighbor cell frequency lists in accordance with the present invention.

Referring next to FIG. 4, there are diagrammatically illustrated some of the procedures and techniques which are used in the present invention to determine neighbor cell lists and cell relationships for purposes of frequency planning or for admission control. The radio network controller 30 includes an administration module 41 incorporating a statistics unit 42 and a frequency list generator 43. A repository of general knowledge about the architecture and configuration of the system 44 is connected to the frequency list generator 43 to assist in the preparation of a best neighbor cell list in accordance with the present invention. The module 41 is connected to receive measurement reports from the three illustrative base stations BS1–BS3 while the frequency list generator 43 of the module 41 is connected to supply lists of frequencies upon which measurement is to be made to each of the base stations BS1–BS3.

The frequency list generator 43 determines which cells should be investigated by, for example, BS1 for neighbor cell relationships or for interference relationship for purposes of frequency planning or admission control. The appropriate frequencies used by BS2 and BS3 are determined from a database and passed on from the frequency list generator 43 to BS1. This is represented at numeral "1" in the diagram of FIG. 4. Each of the base stations BS2 and BS3 is transmitting a unique identification in accordance with the present invention. The frequencies on which the base stations of neighboring cells are transmitting are sent to MS1 by BS1 so that the mobile station knows what frequencies to listen to and measure. This is represented at "2".

As represented as "3" the mobile stations MS1 and MS2 and/or the base stations BS1–BS3 listen to the appropriate BCCH carrier frequencies and attempt to decode the unique ID carried by each frequency and measure its signal strength. Once the unique ID is decoded and the signal strength is measured by a mobile or base station, it then passes that information back to its serving base station in the same way that the frequency information was passed on from base station to mobile in "2". For example, if the network is attempting to determine whether BS2 is a good neighbor of BS1, the mobile station MS1 will measure the strength of the control channel of BS2 and decode the unique ID transmitted on that channel. By having a unique ID transmitted on the channel, it is possible for the network to distinguish between signals from BS2 and BS3 even they may be using the same control channel frequency. Similarly, if the information measured and sent to the network was for purposes of frequency planning, the origin of any measured interference on frequencies transmitted by BS2 or BS3 can be determined by decoding the unique ID associated with the interfering signal. If, on the other hand, measurements are made at "3" by the base station in an attempt to ascertain uplink interference, it is necessary for the mobile stations operating in other cells and producing the interference to also be transmitting either mobile specific unique IDs or an ID which is unique to the cell within which those mobile stations are then operating. If the measurements are being made by the mobile stations for purposes of ascertaining downlink interference, the measured signals of the base stations contain a unique ID which specifically identifies the source of that signal.

Represented at "4" is the process by which the information, including unique base station and mobile station IDs which were successfully decoded and the associated signal strength of the signals carrying those IDs, is transmitted back to the radio network controller 30. The measured information may be compiled over a period of time in each of the respective base stations BS1–BS3 before it is sent back to the network controller 30. It should be noted that information about the strength of signals from other cells is included so that an analysis of best neighbor server can be made.

The statistics unit 42 performs analysis of the received information at "5" and, sends that analysis to the frequency list generator 43. The frequency list generator 43 integrates the information based on the analysis by the statistics unit 41 with the general system knowledge 44 and decides the next step in proceeding with the measurement/frequency allocation process.

The present invention incorporates three separate techniques by which identity codes which are unique system-wide may be transmitted over the air interface between a base station and a mobile station to enable the receiver to identify the specific base station and/or mobile station associated with each frequency which is measured. This enables the system to determine the source of each signal and use that information in various algorithmic expressions for system control. The three separate techniques include the following:

(1) Each mobile station repeatedly transmits its own unique identity during each period of a selected time interval or on request by the network. A base station receiver reads the identity code of the mobile station and the network then determines from that information the cell from which the signal was sent;

(2) Each mobile station is informed by its base station of the unique identity of its own cell within the system and thereafter repeatedly transmits this identity during each period of a selected time interval or on request. A base station receiver reads the identity code and the network determines from that information the cell from which the signal was sent; and (3) Each base station periodically transmits its own unique identity within the system. A mobile station reads the identity code broadcast by each base station it is monitoring and sends that information to its own base station which informs the network as to the cell from which the signal was sent.

Each of these three techniques enables unique identification of the cell within the system from which particular signal quality measurements were made and from which the radio signal was sent. These unique cell-specific data then allow algorithms to be formulated and generate adaptive procedures within the cellular radio system.

Figure 5:
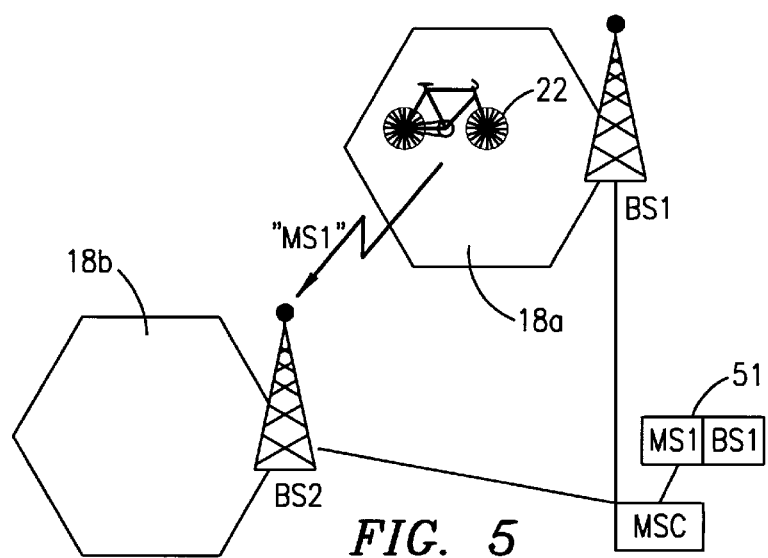
FIG. 5 is a block diagram illustrating one aspect of the system of the present invention.

Referring now to FIG. 5, the first technique of unique signal source identification is illustrated in which the mobile station 22 has set up a call in a first cell 18a which is being served by a base station BS1. The base station BS2 in a cell 18b listens to the channel on which the mobile 22 is connected and picks up the message which includes the mobile station's unique identity within the system. The network normally stores the information that the mobile station 22 ("MS1") is connected to the base station BS1 in the form of a data entry 51 in the MSC 27. Thereafter, when signal quality measurements are received and associated with a particular mobile station the origin of the signal within the network can be determined and used to implement specific procedures within the system. For example, a remote cell from which is received a signal which is producing cochannel interference in the cell where measurements are being made can be identified and subsequent changes in the frequency plan made to eliminate that interference. Similarly, a very high quality neighbor cell can be identified and that cell added to the neighbor cell list of the mobile even though it had not originally been included.

Figure 6:
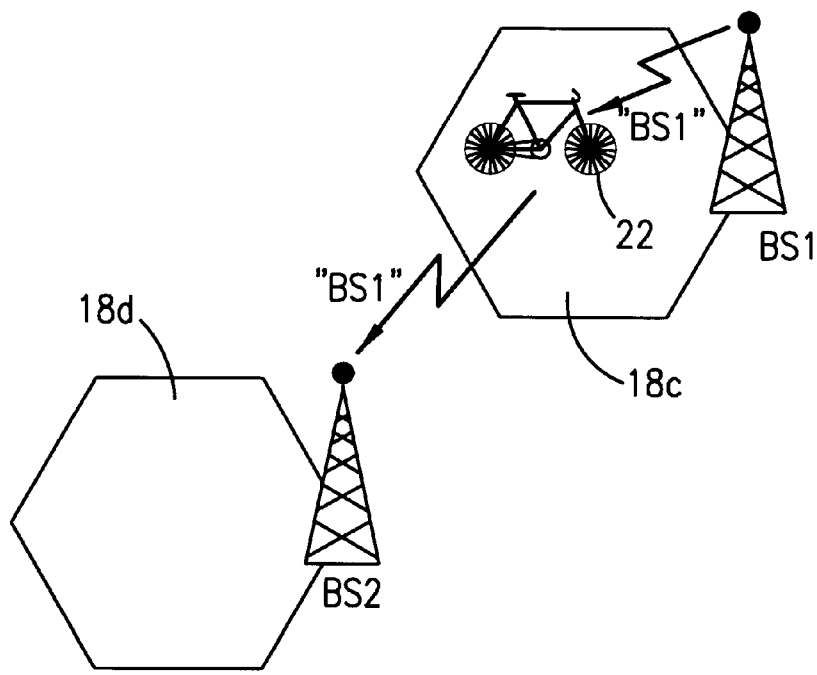
FIG. 6 is a block diagram illustrating another aspect of the system of the present invention.

The second technique for unique identification of cell location is illustrated in FIG. 6 in which mobile station 22 has set up a call in a first cell 18c served by a base station BS1. The base station BS1 sends out its own system-unique identity code one or more times to the mobile 22. Thereafter, periodically within each certain time interval, the mobile 22 transmits the identity of its base station which can be received by all neighboring base stations, for example, base station BS2 serving cell 18d. The base station BS2 serving the second cell 18d listens to the channel on which the mobile 22 is connected and picks up the base station identity associated with that message. Thus, the network knows the origin of the signal for future administrative use.

Figure 7:
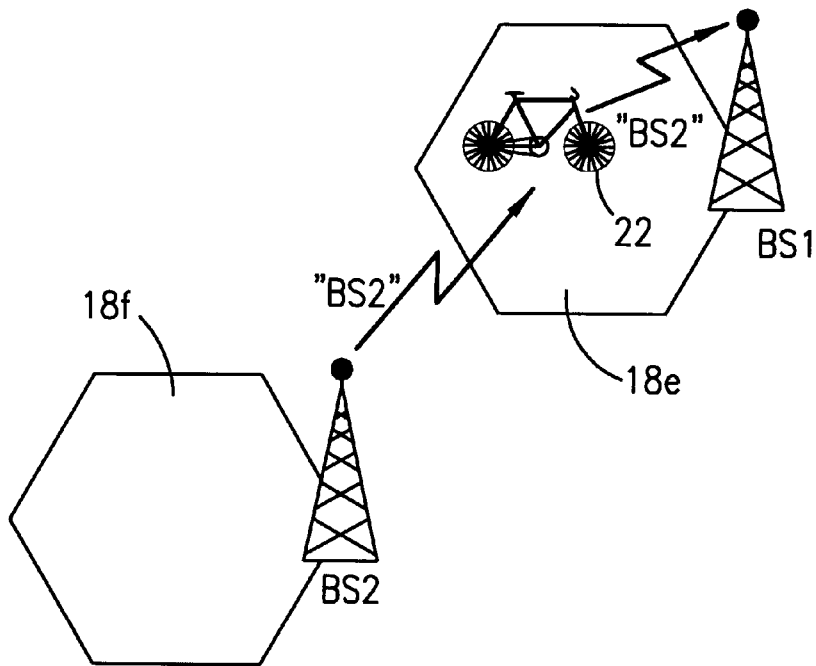
FIG. 7 is a block diagram illustrating an additional embodiment of the present invention.

Finally, the third technique for system-unique identification of a signal is depicted in FIG. 7. There a mobile station 22 has set up a call in a first cell 18e served by a base station BS1. Each of the base stations BS1 and BS2 periodically sends out its own system-unique identity code. The mobile 22 being served by the first base station BS1 listens to a channel being broadcast by the second base station BS2 and picks up its identity message. The mobile then reports the identity of the neighbor base station BS2 associated with that channel to its own base station BS1. Thus, the network knows the origin of the signal quality measurement signals received from the mobile.

Figure 8:
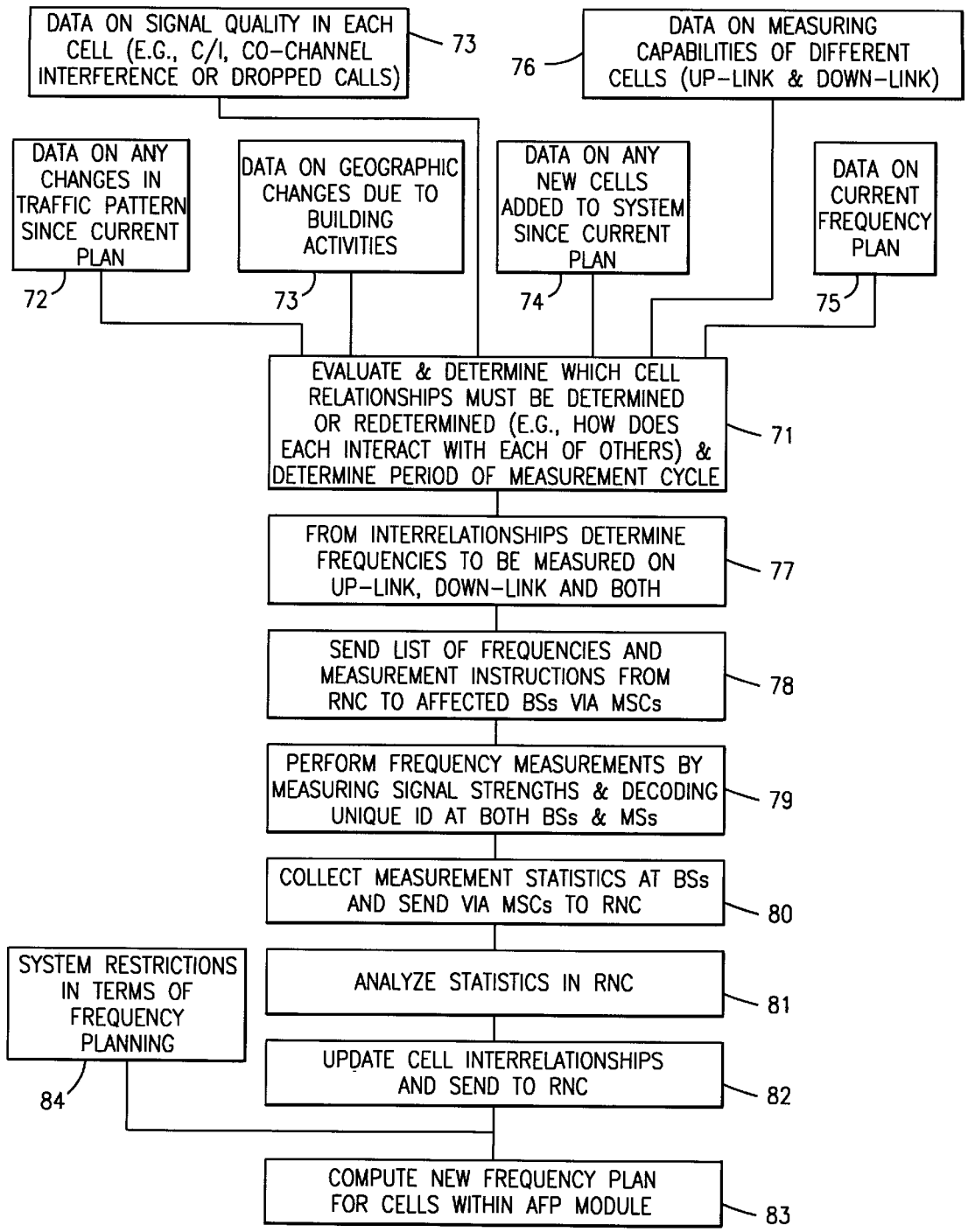
FIG. 8 is a flow chart illustrating certain aspects of the present invention.

Referring next to FIG. 8, there is shown a flow chart illustrating certain aspects of a method by which frequency planning within the cellular system may be performed in accordance with the present invention. At 71, the radio network decides on the interrelationships among the various cells which must be determined or redetermined. That is, the RNC determines which of the cell relationships in the group is currently unknown and, thus, must be (re)determined. The RNC also determines the period over which measurement cycles are to be repeated. RNC makes its evaluation and determination based upon the input of data from a number of different sources and with respect to a number of different parameters. At 72 data relating to any changes in the traffic pattern which have occurred since the implementation of the current frequency plan is input to the RNC. For example, the RNC may determine that the load in different cells has changed over time. Similarly, at 73 data on any geographic changes due to building activities is input. At 73 the system inputs data on the signal quality which is currently understood to be in existent in each of the cells. For example, the C/I, the co-channel interference information and statistics on dropped calls may be included within these data. At 74 data on any new cells which have been added to the system since the implementation of the current frequency plan is input to the RNC and at 75 data on the current frequency plan itself is entered. At 76 data on the measuring capabilities of each of the different cells in both the uplink and downlink direction is input to the RNC.

Based upon the desire relationships among the cells, at 77 the RNC determines which frequencies are to be measured in the different cells. At 78 a list of each of these frequencies along with the measurement instructions and the like, is sent from the RNC to the affected base stations which are to perform the measurements via their respective MSCs.

At 79 the signal quality measurements are performed within both base stations and mobile stations of the affected cells. In this process signal strength on each of the frequencies measured as well as the unique ID s indicative of the source of those signals is decoded. The information on which frequencies to measure and the measurement results are sent on the control channels (primarily SACCH) from the base station to the mobile stations just as in the case of MAHO measurements today. At 80 measurement statistics are collected at the base stations of the affected cells and sent via their respective MSCs to the RNC. At 81 the statistics are analyzed within the RNC and at 82 the cell interrelationships are updated and sent to the automatic frequency planning module. Finally, at 83 the AFP module computes a new frequency plan for the affected cells based upon the interrelationships input to it from the RNC as well as data input at 84 relating to the system restrictions in terms of frequency planning.

The system of the present invention allows unique identification of a particular cell enabling more accurate and efficient frequency planning and neighbor cell list preparation and the implementation of cellular system management algorithms of an adaptive nature.

Although preferred embodiments of the method and apparatus of the present invention have been illustrated in the accompanying drawings and described in the foregoing description, it is understood that the invention is not limited to the embodiment(s) disclosed but is capable of numerous rearrangements, modifications and substitutions without departing from the spirit of the invention as set forth and defined in the following claims.

What is claimed is:

1. A method for the identification of a particular cell from which a measured radio signal is received from a mobile station within a cellular radio communication network, said method comprising:

storing within said network indicia which associates each mobile station with the base station which is currently serving said each mobile station, each base station of said network having at least one of a plurality of unique base station identifications;

transmitting as part of the radio signal from a mobile station an identity signal which contains the unique identity of said mobile station within said network;

receiving said radio signal containing said identity signal from said mobile station at a base station which serves a cell which is not the currently serving cell of said mobile station;

measuring the value of said received radio signal;

sending a message from said receiving base station to the network to determine with which base station the mobile station having said unique identity is presently associated and considering the cell served by said associated base station, based on a corresponding unique base station identification from among said plurality of unique base station identifications, as the geographic source of said signal received from said mobile station and measured by said receiving base station; and utilizing, by the network, said value of said received radio signal and said geographic source of said signal received from said mobile station for cell planning or cell management.

2. As method for the identification of a particular cell from which a measured radio signal is received from a mobile station within a cellular radio communication network as set forth in claim 1 wherein said mobile station is operating in the active mode.

3. A method for the identification of a particular cell from which a measured radio signal is received from a mobile station within a cellular radio communication network as set forth in claim 1 wherein said radio signal containing an identity signal is sent from said mobile station periodically.

4. A method for the identification of a particular cell from which a measured radio signal is received from a mobile station within a cellular radio communication network as set forth in claim 1 wherein said radio signal containing an identity signal is sent from said mobile station in response to a request by said radio communication network.

5. A method for the identification of a particular cell from which a measured radio signal is received from a mobile station within a cellular radio communication network as set forth in claim 1 which also includes:

associating within said measuring base station, information obtained from the measurement of said radio signal and the source from which said radio signal originated; and sending a measurement report from the base station to the network containing measurement information on a plurality of carrier frequencies and the source within the network of each carrier signal.

6. A method for the identification of a particular cell from which a measured radio signal is received from a mobile station within a cellular radio communication network as set forth in claim 5 which also includes:

using said measurement information from said measurement reports within said network to formulate a best neighbor list for at least one mobile station.

7. A method for the identification of a particular cell from which a measured radio signal is received from a mobile station within a cellular radio communication network as set forth in claim 5 which also includes:

using said measurement information from said measurement reports within said network to formulate a frequency usage plan for a group of cells within said network which include the cell serving said uniquely identified mobile station, the cell serving said uniquely identified mobile station being determinable from said corresponding unique base station identification.

8. A method for the identification of a particular cell from which a measured radio signal is received from a mobile station within a cellular radio communication network, said method comprising:

transmitting from a base station to each mobile station it is serving an identity signal which contains the unique identity of said base station;

receiving at a mobile station, the radio signal of which is to be measured, said unique identity signal from its serving base station;

transmitting as part of the radio signal from a said mobile station operating in active mode an identity signal which contains the unique identity of the base station which is serving it;

measuring the value of the received radio signal from said mobile station at a base station which is not serving said mobile station;

associating the measurements of the received radio signal with the cell served by the base station identified in the identity signal as the geographic source of said signal received from said mobile station and measured by said receiving base station; and utilizing, by the network, said value of said received radio signal from said mobile station and said geographic source of said signal received from said mobile station for cell planning or cell management.

9. A method for the identification of a particular cell from which a measured radio signal is received from a mobile station within a cellular radio communication network as set forth in claim 8 wherein said mobile station is operating in the active mode.

10. A method for the identification of a particular cell from which a measured radio signal is received from a mobile station within a cellular radio communication network as set forth in claim 8 wherein said radio signal containing an identity signal is sent from said mobile station periodically.

11. A method for the identification of a particular cell from which a measured radio signal is received from a mobile station within a cellular radio communication network as set forth in claim 8 wherein said radio signal containing an identity signal is sent from said mobile station in response to a request by said radio communication network.

12. A method for the identification of a particular cell from which a measured radio signal is received from a mobile station within a cellular radio communication network as set forth in claim 8, which includes the additional step of:

sending a measurement report from the measuring base station to the network containing measurement information on a plurality of carrier frequencies and the source within the network of the each carrier signal.

13. A method for the identification of a particular cell from which a measured radio signal is received from a mobile station within a cellular radio communication network as set forth in claim 8 wherein:

said identity signal which contains the unique identity of said base station is transmitted periodically from said base station.

14. A method for the identification of a particular cell from which a measured radio signal is received from a mobile station within a cellular radio communication network as set forth in claim 12, which contains the additional step of:

using said measurement information from said measurement reports within said network to formulate a best neighbor list for at least one mobile station.

15. A method for the identification of a particular cell from which a measured radio signal is received from a mobile station within a cellular radio communication network as set forth in claim 12 which also includes:

using said measurement information from said measurement reports within said network to formulate a frequency usage plan for a group of cells within said network which include the cell serving said uniquely identified base station.

16. A method for the identification of a particular cell from which a measured radio signal is received by a mobile station within a cellular radio communication network, said method comprising:

transmitting from a base station an identity signal which contains the unique identity of said base station;

receiving at a mobile station, a radio signal from a base station which is to be measured, said radio signal containing said unique identity signal;

measuring the value of the received radio signal from said base station at a mobile station which is not being served by said base station;

associating the measurements of the received radio signal with the cell served by the base station identified in the identity signal as the geographic source of said signal; and utilizing, by the network, said value of said received radio signal from said base station and said geographic source of said signal for cell planning or cell management.

17. A method for the identification of a particular cell from which a measured radio signal is received from a mobile station within a cellular radio communication network as set forth in claim 16 wherein said mobile station is operating in the active mode.

18. A method for the identification of a particular cell from which a measured radio signal is received from a mobile station within a cellular radio communication network as set forth in claim 16 wherein said radio signal containing an identity signal is sent from said base station periodically.

19. A method for the identification of a particular cell from which a measured radio signal is received from a mobile station within a cellular radio communication network as set forth in claim 16 wherein said radio signal containing an identity signal is sent from said base station in response to a request by said radio communication network.

20. A method for the identification of a particular cell from which a measured radio signal is received by a base station within a cellular radio communication network, said method comprising:

transmitting from a first base station an identity signal which contains the unique identity of said base station;

receiving at a second base station, a radio signal from a base station which is to be measured, said radio signal containing said unique identity signal;

measuring the value of the received radio signal from said first base station at said second base station;

associating the measurements of the received radio signal with the cell served by the base station identified in the identity signal as the geographic source of said signal; and utilizing, by the network, said value of said received radio signal from said first base station and said geographic source of said signal for cell planning or cell management.

21. A method for the identification of a particular cell from which a measured radio signal is received from a base station within a cellular radio communication network as set forth in claim 20 wherein said radio signal containing an identity signal is sent from said first base station periodically.

22. A method for the identification of a particular cell from which a measured radio signal is received from a base station within a cellular radio communication network as set forth in claim 20 wherein said radio signal containing an identity signal is sent from said first base station in response to a request by said radio communication network.

23. A method for the identification of a particular cell from which a measured radio signal is received by a base station within a cellular radio communication network as set forth in claim 20 wherein said associating step comprises:
  sending the measurement results of each measured radio signal along with identity information contained within that signal from the measuring base station to the network as measurement information; and
  identifying within the network the base station and cell associated with the unique identity information.

24. A method for the identification of a particular cell from which a measured radio signal is received by a base station within a cellular radio communication network as set forth in claim 23, which contains the additional step of:
  using said measurement information within said network to formulate a best neighbor list for at least one mobile station.

25. A method for the identification of a particular cell from which a measured radio signal is received by a base station within a cellular radio communication network as set forth in claim 23 which also includes:
  using said measurement information within said network to formulate a frequency usage plan for a group of cells within said network which include the cell being served by said uniquely identified base station.

26. A system for the identification of a particular cell from which a measured radio signal is received from a mobile station within a cellular radio communication network comprising:
  means for storing within said network indicia which associates each mobile station with the base station which is currently serving said each mobile station, each base station of said network having at least one of a plurality of unique base station identifications;
  means for transmitting as part of the radio signal from a mobile station operating in active mode an identity signal which contains the unique identity of said mobile station within said network;
  means for receiving said radio signal containing said identity signal from said mobile station at a base station which serves a cell which is not the currently serving cell of said mobile station;
  means for measuring the value of said received radio signal;
  means for sending a message from said receiving base station to the network to determine with which base station the mobile station having said unique identity is presently associated and considering the cell served by said associated base station, based on a corresponding unique base station identification from among said plurality of unique base station identifications, as the geographic source of said signal received from said mobile station and measured by said receiving base station; and
  means for utilizing, by the network, said value of said received radio signal and said geographic source of said signal received from said mobile station for cell planning or cell management.

27. A system for the identification of a particular cell from which a measured radio signal is received from a mobile station within a cellular radio communication network as set forth in claim 26 which also includes:
  means for associating within said measuring base station, information obtained from the measurement of said radio signal and the source from which said radio signal originated; and
  means for sending a measurement report from the base station to the network containing measurement information on a plurality of carrier frequencies and the source within the network of each carrier signal.

28. A system for the identification of a particular cell from which a measured radio signal is received from a mobile station within a cellular radio communication network as set forth in claim 26 which also includes:
  means for using said measurement information from said measurement reports within said network to formulate a best neighbor list for at least one mobile station.

29. A system for the identification of a particular cell from which a measured radio signal is received from a mobile station within a cellular radio communication network as set forth in claim 26 which also includes:
  means for using said measurement information from said measurement reports within said network to formulate a frequency usage plan for a group of cells within said network which include the cell serving said uniquely identified mobile station, the cell serving said uniquely identified mobile station being determinable from said corresponding unique base station identification.

30. A system for the identification of a particular cell from which a measured radio signal is received from a mobile station within a cellular radio communication network comprising:
  means for transmitting from a base station to each mobile station it is serving an identity signal which contains the unique identity of said base station;
  means for receiving at a mobile station, the radio signal of which is to be measured, said unique identity signal from its serving base station;
  means for transmitting as part of the radio signal from a said mobile station an identity signal which contains the unique identity of the base station which is serving it;
  means for measuring the value of the received radio signal from said mobile station at a base station which is not serving said mobile station; means for associating the measurements of the received radio signal with the cell served by the base station identified in the identity signal as the geographic source of said signal received from said mobile station and measured by said receiving base station; and
  means for utilizing, by the network, said value of said received radio signal from said mobile station and said geographic source of said signal received from said mobile station for cell planning or cell management.

31. A system for the identification of a particular cell from which a measured radio signal is received from a mobile station within a cellular radio communication network as set forth in claim 30, which further contains:
  means for sending a measurement report from the measuring base station to the network containing measurement information on a plurality of carrier frequencies and the source within the network of the each carrier signal.

32. A system for the identification of a particular cell from which a measured radio signal is received from a mobile station within a cellular radio communication network as set forth in claim 30 wherein:
  said identity signal which contains the unique identity of said base station is transmitted periodically from said base station.

33. A system for the identification of a particular cell from which a measured radio signal is received from a mobile station within a cellular radio communication network as set forth in claim 31, which also includes:

means for using said measurement information from said measurement reports within said network to formulate a best neighbor list for at least one mobile station.

34. A system for the identification of a particular cell from which a measured radio signal is received from a mobile station within a cellular radio communication network as set forth in claim 31 which also includes:

means for using said measurement information from said measurement reports within said network to formulate a frequency usage plan for a group of cells within said network which include the cell being served by said uniquely identified base station.

35. A system for the identification of a particular cell from which a measured radio signal is received by a mobile station within a cellular radio communication network comprising:

means for transmitting from a base station an identity signal which contains the unique identity of said base station;

means for receiving at a mobile station, a radio signal from a base station which is to be measured, said radio signal containing said unique identity signal;

means for measuring the value of the received radio signal from said base station at a mobile station which is not being served by said base station;

means for associating the measurements of the received radio signal with the cell served by the base station identified in the identity signal as the geographic source of said signal; and means for utilizing, by the network, said value of said received radio signal from said base station and said geographic source of said signal for cell planning or cell management.

36. A system for the identification of a particular cell from which a measured radio signal is received by a mobile station within a cellular radio communication network as set forth in claim 35 wherein said associating means comprises:

means for sending the measurement results of each measured radio signal along with identity information contained within that signal from the measuring mobile station to its serving base station; and means for identifying within the network the base station and cell associated with the unique identity information.

37. A system for the identification of a particular cell from which a measured radio signal is received by a mobile station within a cellular radio communication network as set forth in claim 36, which also contains:

means for using said measurement information within said network to formulate a best neighbor list for at least one mobile station.

38. A system for the identification of a particular cell from which a measured radio signal is received by a mobile station within a cellular radio communication network as set forth in claim 35 which also includes:

means for using said measurement information within said network to formulate a frequency usage plan for a group of cells within said network which include the cell being served by said uniquely identified base station.

39. A method for performing automatic system administration functions within a cellular radio network having a plurality cells served by a plurality of base stations connected by at least one mobile switching center and a plurality of mobile stations moving within the cells, said method comprising:

determining which cells from among a group comprising a plurality of cells within said network must have their interrelationships determined;

determining, based up the present frequency allocation plan of the network, a list of frequencies to be measured to determine relative strengths thereof and interferences therebetween at different locations within said group of cells;

sending said list of frequencies and measurement instructions to each of a plurality of said base stations serving the cells in said group and to a plurality of mobile stations moving within the cells in said group;

performing frequency measurements by measuring the signal strengths of each of said frequencies in said list;

determining the source from which each of the signals on each of the frequencies in said list is broadcast and associating each measurement with its source;

collecting the measurement statistics and associated source information at each of said base stations serving the cells of said group;

sending said collected information to said network; and performing automatic system administration functions within said network based upon said collected information.

40. A method for performing automatic system administration functions within a cellular radio network having a plurality cells served by a plurality of base stations connected by at least one mobile switching center and a plurality of mobile stations moving within the cells as set forth in claim 39 in which said step of performing automatic system administration functions includes:

redefining the interrelationship between the cells in said group based upon said collected information; and computing a new frequency allocation plan for the cells in said group based upon said collected information.

41. A method for performing automatic system administration functions within a cellular radio network having a plurality cells served by a plurality of base stations connected by at least one mobile switching center and a plurality of mobile stations moving within the cells as set forth in claim 39 in which said step of performing automatic system administration functions includes:

redefining the interrelationship between the cells in said group based upon said collected information; and preparing a best neighbor list for each of the cells in said group.

42. A system for performing automatic system administration functions within a cellular radio network having a plurality cells served by a plurality of base stations connected by at least one mobile switching center and a plurality of mobile stations moving within the cells comprising:

means for determining the interrelationship between a group comprising a plurality of cells within said network including determining how each cell in said group interacts with each of the other cells in said group;

means for determining, based up the present frequency allocation plan of the network, a list of frequencies to be measured to determine relative strengths thereof and interferences therebetween at different locations within said group of cells;

means for sending said list of frequencies and measurement instructions to each of a plurality of said base stations serving the cells in said group and to a plurality of mobile stations moving within the cells in said group;

means for performing frequency measurements by measuring the signal strengths of each of said frequencies in said list;

means for determining the source from which each of the signals on each of the frequencies in said list is broadcast and associating each measurement with its source;

means for collecting the measurement statistics and associated source information at each of said base stations serving the cells of said group;

means for sending said collected information to said network; and means for performing automatic system administration functions within said network based upon said collected information.

43. A system for performing automatic system administration functions within a cellular radio network having a plurality cells served by a plurality of base stations connected by at least one mobile switching center and a plurality of mobile stations moving within the cells as set forth in claim 42 wherein said means for performing automatic system administration functions includes:

means for redefining the interrelationship between the cells in said group based upon said collected information; and means for computing a new frequency allocation plan for the cells in said group based upon said collected information.

44. A system for performing automatic system administration functions within a cellular radio network having a plurality cells served by a plurality of base stations connected by at least one mobile switching center and a plurality of mobile stations moving within the cells as set forth in claim 42 wherein said means for performing automatic system administration functions includes:

means for redefining the interrelationship between the cells in said group based upon said collected information; and means for preparing a best neighbor list for each of the cells in said group.

* * * * *

UNITED STATES PATENT AND TRADEMARK OFFICE
CERTIFICATE OF CORRECTION

PATENT NO. : 6,212,384 B1
DATED : April 3, 2001
INVENTOR(S) : Almgren et al.

It is certified that error appears in the above-identified patent and that said Letters Patent is hereby corrected as shown below:

<u>Column 12,</u>
Line 9, replace "As" with -- A --

Signed and Sealed this

Twenty-ninth Day of January, 2002

Attest:

JAMES E. ROGAN
*Attesting Officer*     *Director of the United States Patent and Trademark Office*